(12) United States Patent
Takayanagi et al.

(10) Patent No.: US 9,014,891 B2
(45) Date of Patent: Apr. 21, 2015

(54) CONTROL DEVICE FOR HYBRID VEHICLE, AND HYBRID VEHICLE INCORPORATING CONTROL DEVICE

(75) Inventors: Hiroyuki Takayanagi, Toyota (JP); Hiroki Endo, Nisshin (JP); Masaya Yamamoto, Kasugai (JP)

(73) Assignees: Toyota Jidosha Kabushiki Kaisha, Toyota-Shi (JP); Denso Corporation, Kariya-Shi (JP)

( * ) Notice: Subject to any disclaimer, the term of this patent is extended or adjusted under 35 U.S.C. 154(b) by 156 days.

(21) Appl. No.: 13/643,941

(22) PCT Filed: Apr. 19, 2011

(86) PCT No.: PCT/JP2011/059580
§ 371 (c)(1),
(2), (4) Date: Oct. 26, 2012

(87) PCT Pub. No.: WO2011/136076
PCT Pub. Date: Nov. 3, 2011

(65) Prior Publication Data
US 2013/0041543 A1    Feb. 14, 2013

(30) Foreign Application Priority Data

Apr. 28, 2010 (JP) ................................. 2010-102952

(51) Int. Cl.
*B60W 20/00* (2006.01)
*B60K 6/445* (2007.10)
(Continued)

(52) U.S. Cl.
CPC .............. *B60K 6/445* (2013.01); *B60L 11/123* (2013.01); *B60L 11/14* (2013.01); *B60L 11/1816* (2013.01); *B60L 11/1862* (2013.01); *B60L 2240/423* (2013.01); *B60W 10/06* (2013.01); *B60W 10/08* (2013.01); *B60W 10/26* (2013.01); *B60W 20/00* (2013.01); *B60W 2710/086* (2013.01); *F02D 29/02* (2013.01); *Y02T 10/6217* (2013.01); *Y02T 10/6239* (2013.01); *Y02T 10/6286* (2013.01); *Y02T 10/642* (2013.01); *Y02T 10/7005* (2013.01); *Y02T 10/7044* (2013.01);
(Continued)

(58) Field of Classification Search
None
See application file for complete search history.

(56) References Cited

U.S. PATENT DOCUMENTS 6,694,232 B2 * 2/2004 Saito et al. ...................... 701/22
7,173,396 B2 * 2/2007 Gunji ............................. 320/132

(Continued)

FOREIGN PATENT DOCUMENTS

JP    2009-166513 A    7/2009

OTHER PUBLICATIONS

International Search Report mailed Jul. 19, 2011 of PCT/JP2011/059580.

*Primary Examiner* — John R Olszewski
*Assistant Examiner* — David Merlino
(74) *Attorney, Agent, or Firm* — Kenyon & Kenyon LLP

(57) ABSTRACT

A control unit increases a discharge allowable power when the running mode is at a charge depleting mode and an engine is stopped. An engine operation determination unit determines whether the engine is to be set at load operation or not based on a non-increased power value when the running mode is at the charge sustaining mode, and based on an increased power value when the running mode is at the charge depleting mode. In the case where the engine is at no-load operation, the engine operation determination unit determines whether the engine is to be set at load operation or not based on the non-increased power value even if the running mode is at the charge depleting mode.

7 Claims, 10 Drawing Sheets

(51) Int. Cl.
- *B60L 11/12* (2006.01)
- *B60L 11/14* (2006.01)
- *B60L 11/18* (2006.01)
- *B60W 10/06* (2006.01)
- *B60W 10/08* (2006.01)
- *B60W 10/26* (2006.01)
- *F02D 29/02* (2006.01)
- *B60L 7/14* (2006.01)

(52) U.S. Cl.
CPC ............ *Y02T10/705* (2013.01); *Y02T 10/7077* (2013.01); *Y02T 10/7088* (2013.01); *Y02T 90/121* (2013.01); *Y02T 90/14* (2013.01); *B60L 7/14* (2013.01); *B60L 11/1859* (2013.01); *B60L 11/1877* (2013.01); *B60L 2210/30* (2013.01); *B60L 2240/12* (2013.01); *B60L 2240/443* (2013.01); *B60L 2240/461* (2013.01); *B60L 2240/545* (2013.01); *Y02T 10/7241* (2013.01); *Y02T 90/127* (2013.01)

(56) References Cited

U.S. PATENT DOCUMENTS

| | | | |
|---|---|---|---|
| 7,826,941 B2* | 11/2010 | Hayashi et al. | 701/22 |
| 8,392,042 B2* | 3/2013 | Noiret | 701/22 |
| 2010/0145560 A1* | 6/2010 | Komatsu et al. | 701/22 |
| 2011/0166733 A1* | 7/2011 | Yu et al. | 701/22 |
| 2011/0202223 A1* | 8/2011 | Nefcy et al. | 701/22 |
| 2013/0024063 A1* | 1/2013 | Yamamoto et al. | 701/22 |
| 2013/0030634 A1* | 1/2013 | Endo et al. | 701/22 |

* cited by examiner

FIG.4
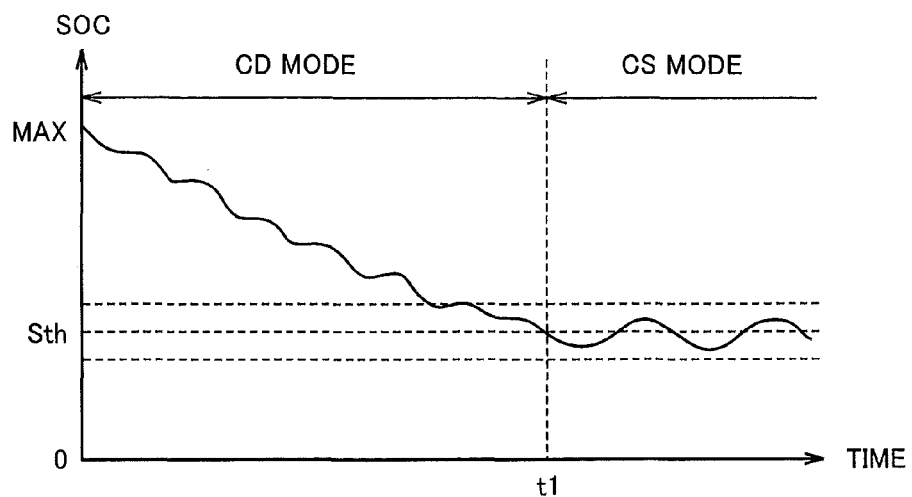
FIG.5
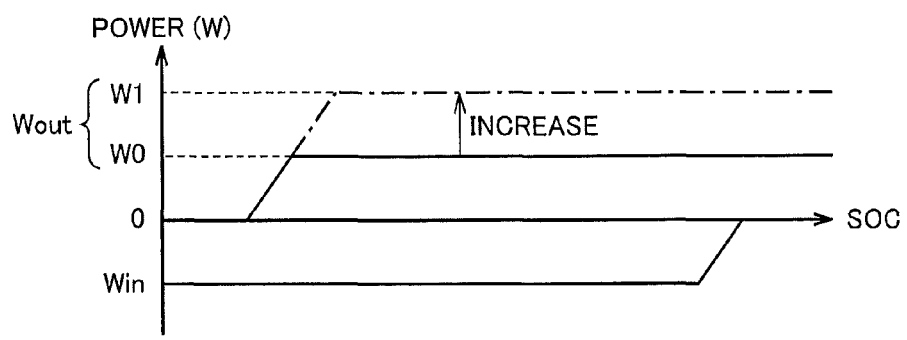
FIG.6
|  | CD MODE | CS MODE |
|---|---|---|
| ENGINE CURRENTLY STOPPED | INCREASE | NON-INCREASE |
| ENGINE CURRENTLY OPERATING | NON-INCREASE | NON-INCREASE |

CONTROL DEVICE FOR HYBRID VEHICLE, AND HYBRID VEHICLE INCORPORATING CONTROL DEVICE

This is a 371 national phase application of PCT/JP2011/059580 filed 19 Apr. 2011, which claims priority to Japanese Patent Application No. 2010-102952 filed 28 Apr. 2010, the contents of which are incorporated herein by reference.

TECHNICAL FIELD

The present invention relates to a control device for a vehicle, and a hybrid vehicle incorporating the control device. Particularly, the present invention relates to a control device for a hybrid vehicle incorporating an internal combustion engine and an electric motor as the power source, and a hybrid vehicle incorporating the control device.

BACKGROUND ART

Hybrid vehicles are attracting attention as environment-friendly vehicles. A hybrid vehicle incorporates a power storage device, an inverter, and an electric motor driven by the inverter, in addition to a conventional internal combustion engine, as the power source for traction.

Japanese Patent Laying-Open No. 2009-166513 (PTL 1) discloses the method for suppressing overdischarge of a power storage device reliably in such a hybrid vehicle. This hybrid vehicle is switched between an HV running mode and an EV running mode according to the required driving force based on the output from various sensors. When there is a switching request to the HV running during execution of the EV running mode, the engine is cranked by a motor generator receiving electric power from the power storage device to start the engine. A discharge allowable power Wout is provided such that the voltage of the power storage device does not become lower than the lower limit voltage, and a torque command value Tref is adjusted such that the motor consumption power does not exceed the provided discharge allowable power Wout. When the accelerator pedal position reaches a predetermined reference value within a predetermined period of time from requesting switching to the HV running mode, the lower limit voltage is temporarily raised.

According to this hybrid vehicle, the power storage device can reliably be protected from overdischarge. As a result, the charging/discharging capability of the power storage device can be exhibited sufficiently to allow the running performance and fuel consumption performance of the vehicle to be improved (refer to PTL 1).

CITATION LIST

Patent Literature

PTL 1: Japanese Patent Laying-Open No. 2009-166513

SUMMARY OF INVENTION

Technical Problem

There is a demand for a hybrid vehicle to run in a state where the internal combustion engine is stopped as much as possible. Recently, attention is focused on the so-called plug-in hybrid vehicle that allows a vehicle-mounted power storage device to be charged from a power supply external to the vehicle. The aforementioned demand is particularly immense in such plug-in hybrid vehicles (hereinafter, a vehicle running using the electric motor alone with the internal combustion engine stopped is referred to as "EV (Electric Vehicle) running", whereas a vehicle running with the internal combustion engine operated is referred to as "HV (Hybrid Vehicle) running)".

For the purpose of improving the sense of EV running by suppressing the frequency of starting the internal combustion engine, the electric power that can be discharged by the power storage device (hereinafter, referred to as "discharge allowable power Wout") can be modified based on a running mode including a first mode in which EV running is given priority (hereinafter, also referred to as "charge depleting (CD) mode", and a second mode in which the internal combustion engine is operated and the state of charge of the power storage device is maintained at a predetermined target (hereinafter, referred to as "charge sustaining (CS) mode"), as well as the operation/stop of the internal combustion engine. Specifically, when the running mode is at the CD mode and the internal combustion engine is stopped, the discharge allowable power Wout is increased than when the running mode is at the CD mode and the internal combustion engine is operated, or than when at the CS running mode, allowing the frequency of starting the internal combustion engine to be suppressed to improve the sense of EV running.

From the standpoint of protecting components of the vehicle, there is the case where the internal combustion engine is operated without substantially providing torque output (hereinafter, such operation is called "no-load operation" whereas running with the torque output according to the driver's request is referred to as "load operation"). Since the internal combustion engine is operating even in a no-load operation, discharge allowable power Wout is not increased when the running mode is at the CD mode. In such circumstances, however, if the power determination value for determining whether the internal combustion engine is to be set at load operation or not is an increased discharge allowable power Wout due to the running mode being at the CD mode, the situation in which the discharged electric power from the power storage device is restricted to a non-increased discharge allowable power Wout, and the internal combustion engine cannot attain a load operation until the required power reaches the increased discharge allowable power Wout will arise. As a result, the actual power relative to the required power will be insufficient, leading to degradation in the driveability.

In view of the foregoing, an object of the present invention is to extend EV running and preventing degradation in driveability that may occur during no-load operation at a hybrid vehicle.

Solution to Problem

According to the present invention, a control device for a hybrid vehicle includes a running mode control unit, a discharge allowable power control unit, and a determination unit. The hybrid vehicle includes an internal combustion engine generating vehicle driving force, a power storage device capable of being charged and discharged, and an electric motor receiving electric power from the power storage device for generating vehicle driving force. The internal combustion engine is controlled to operate at load operation or no-load operation. The running mode control unit controls the switching of a running mode including a CD mode and a CS mode. The discharge allowable power control unit sets discharge allowable power Wout at a predetermined first value when the running mode is at the CD mode and the internal combustion engine is operating, or when the running mode is at the CS mode, and increases discharge allowable power Wout to a second value greater than the first value when the running mode is at the CD mode and the internal combustion engine is stopped. The determination unit determines whether the internal combustion engine is to be set at load operation or not, based on the first value when the running mode is at the CS mode, and based on the second value when the running mode is at the CD mode. When the internal combustion engine is operating at no-load operation, the determination unit determines whether the internal combustion engine is to be set at load operation or not based on the first value even if the running mode is at the CD mode.

Preferably, when the running mode is at the first mode and the internal combustion engine is not at no-load operation, the determination unit determines whether the internal combustion engine is to be set at load operation or not based on the second value.

Preferably, when the running mode is at the first mode and the internal combustion engine is operating at no-load operation, the determination unit carries out a stop determination of the internal combustion engine based on the first value when the operation of the internal combustion engine is shifted to load operation based on the first value.

Preferably, the hybrid vehicle further includes a charging device configured to receive supply of electric power from a power supply external to the vehicle to charge the power storage device. The running mode control unit sets the running mode at the first mode after the power storage device is charged by the charging device.

According to the present invention, a control device for a hybrid vehicle includes a running mode control unit, a discharge allowable power control unit, and a determination unit. The hybrid vehicle includes an internal combustion engine generating vehicle driving force, a power storage device capable of being charged and discharged, and an electric motor receiving electric power from the power storage device to generate vehicle driving force. The internal combustion engine is controlled to operate at load operation or no-load operation. The running mode control unit controls switching of the running mode including a CD mode and a CS mode. The discharge allowable power control unit sets discharge allowable power Wout at a predetermined first value when the running mode is at the CD mode and the internal combustion engine is operating, or when the running mode is at the CS mode, and increases discharge allowable power Wout to a second value greater than the first value when the running mode is at the CD mode and the internal combustion engine is stopped. When the running mode is at the CD mode, the determination unit determines whether the internal combustion engine is to be set at load operation or not based on the first value when the internal combustion engine is operating at no-load operation, and based on the second value when the internal combustion engine is not at no-load operation.

Preferably, when the running mode is at the CS mode, the determination unit determines whether the internal combustion engine is to be set at load operation or not based on the first value.

Preferably, when the running mode is at the CD mode and the internal combustion engine is operating at no-load operation, the determination unit carries out a stop determination of the internal combustion engine based on the first value when the operation of the internal combustion engine is shifted to load operation based on the first value.

Preferably, the hybrid vehicle further includes a charging device configured to receive supply of electric power from a power supply external to the vehicle to charge the power storage device. The running mode control unit sets the running mode at the first mode after the power storage device is charged by the charging device.

According to the present invention, the hybrid vehicle includes any control device set forth above.

Advantageous Effects of Invention

According to the present invention, discharge allowable power Wout is set at the first value when the running mode is at the CD mode and the internal combustion engine is operating, or when the running mode is at the CS mode. When the running mode is at the CD mode and the internal combustion engine is stopped, discharge allowable power Wout is increased to a second value greater than the first value. A determination is made as to whether the internal combustion engine is to be set at load operation or not, based on the first value when the running mode is at the CS mode, and based on the second value when the running mode is at the CD mode.

When the internal combustion engine is operating at no-load operation in the present invention, a determination is made as to whether the internal combustion engine is to be set at load operation or not based on the first value even if the running mode is at the CD mode. Therefore, the event of the actual power being insufficient relative to the required power will not occur. Alternatively, when the running mode is at the CD mode, a determination as to whether the internal combustion engine is to be set at load operation or not is made, based on the first value when the internal combustion engine is operating at no-load operation and based on the second value when the internal combustion engine is not at no-load operation. Therefore, the event of the actual power being insufficient relative to the required power will not occur.

Thus, according to the present invention, EV running can be extended and degradation in driveability that may occur in no-load operation can be prevented.

BRIEF DESCRIPTION OF DRAWINGS

FIG. 4 represents the relationship between the change in SOC of the power storage device and the running mode.

FIG. 5 represents the discharge allowable power of the power storage device.

FIG. 6 is a diagram to describe increase/non-increase of the discharge allowable power according to the running mode and operation/stop of the engine.

DESCRIPTION OF EMBODIMENTS

Figure 1:
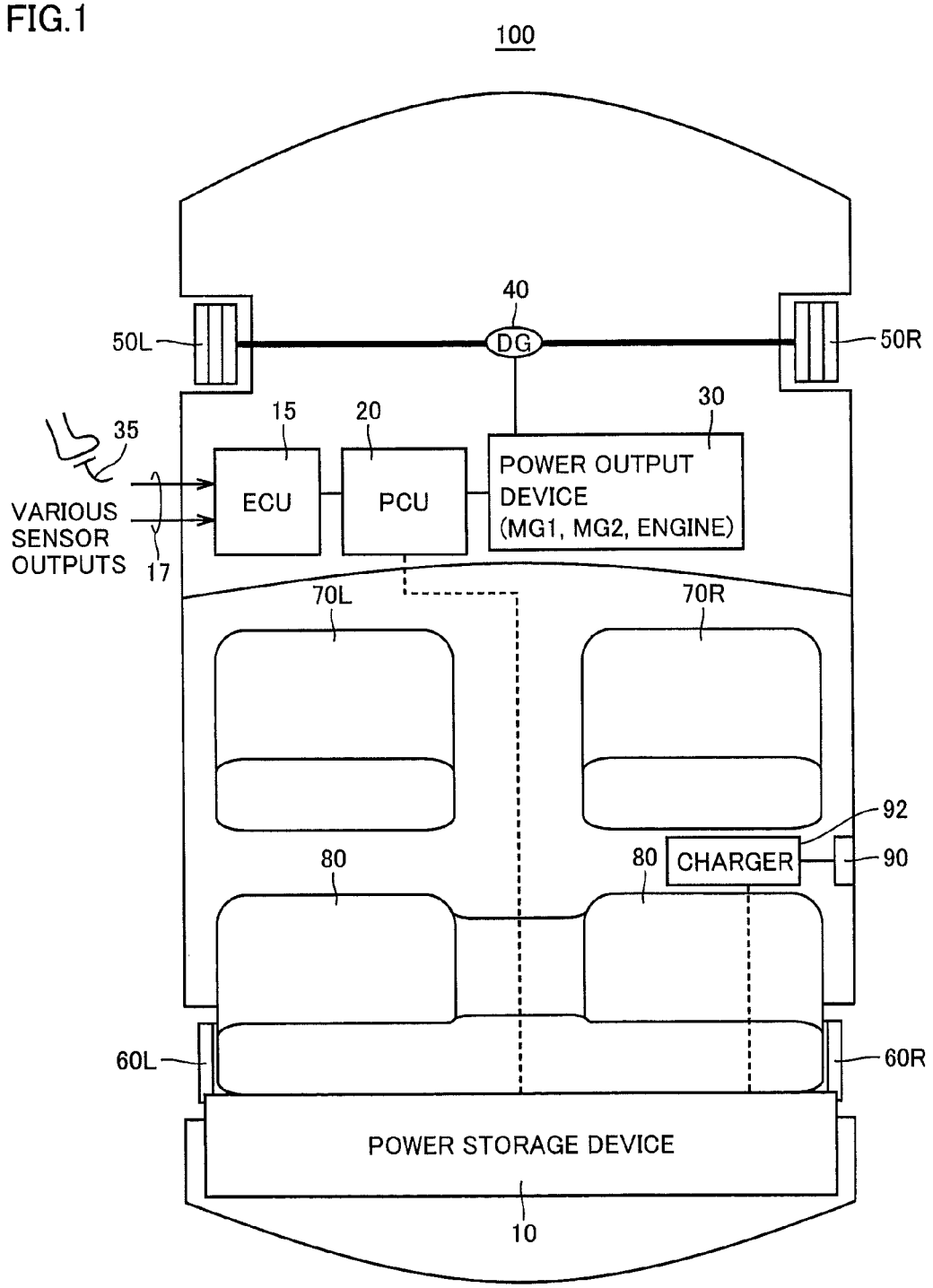
FIG. 1 is a block diagram representing an entire configuration of a hybrid vehicle to which a control device according to an embodiment of the present invention is applied.

Embodiments of the present invention will be described in detail hereinafter with reference to the drawings. In the drawings, the same or corresponding elements have the same reference characters allotted, and description thereof will not be repeated.

FIG. 1 is a block diagram representing an entire configuration of a hybrid vehicle to which a control device according to an embodiment of the present invention is applied. Referring to FIG. 1, a hybrid vehicle 100 includes a power storage device 10, an ECU (Electronic Control Unit) 15, a PCU (Power Control Unit) 20, a power output device 30, and a differential gear (hereinafter, also referred to as DG) 40. Hybrid vehicle 100 further includes front wheels 50L and 50R, rear wheels 60L and 60R, front seats 70L and 70R, a rear seat 80, a charging inlet 90, and a charger 92.

Power storage device 10 is a rechargeable DC power source, formed of a secondary battery such as nickel-metal hydride or lithium ion. Power storage device 10 is disposed at a rear side region of rear seat 80 for example, and electrically connected with PCU 20 to supply DC voltage thereto. Power storage device 10 receives electric power generated by power output device 30 from PCU 20 to be charged. Power storage device 10 is also charged by a charger 92 connected to a charging inlet 90 and receiving electric power supplied from a power supply external to the vehicle. Hereinafter, the power supply external to the vehicle is referred to as "external power supply", and the charging of power storage device 10 by the external power supply is referred to as "external charging".

PCU 20 generically shows a power converter required in hybrid vehicle 100. PCU 20 includes a converter boosting the voltage supplied from power storage device 10, an inverter driving a motor generator included in power output device 30, and the like.

ECU 15 receives various sensor outputs 17 from various types of sensors indicating the driving state and vehicle state. Various sensor outputs 17 include the accelerator pedal position corresponding to the stepping amount on an accelerator pedal 35, the vehicle speed according to the rotational speed of the wheels, and the like. ECU 15 executes various control related to hybrid vehicle 100 based on such sensor outputs applied.

Power output device 30 is provided as the driving source of the wheels, and includes motor generators MG1 and MG2 and an engine. These components are mechanically coupled via a power split device (not shown). In accordance with the running state of hybrid vehicle 100, distribution and coupling of the driving force are implemented among the aforementioned three components via the power split device. As a result, front wheels 50L and 50R are driven. DG 40 transmits the motive power output from power output device 30 to front wheels 50L and 50R, and transmits the rotational force from front wheels 50L and 50R to power output device 30. Accordingly, power output device 30 transmits the motive power from the engine and motor generator to front wheels 50L and 50R via DG 40 to drive front wheels 50L and 50R. Power output device 30 receives the rotational force of the motor generator by front wheels 50L and 50R to generate power and provide the generated power to PCU 20.

Motor generators MG1 and MG2 may function as a power generator and an electric motor. Motor generator MG1 operates mainly as a power generator, and motor generator MG2 operates mainly as an electric motor. Specifically, motor generator MG1 receives some of the output from the engine distributed by the power split device for generating power. Motor generator MG1 receives supply of electric power from power storage device 10 to operate as an electric motor for cranking up and starting the engine.

Motor generator MG2 is driven by at least one of the electric power stored at power storage device 10 and the electric power generated by motor generator MG1. The driving force of motor generator MG2 is transmitted to the driving shaft of front wheels 50L and 50R via DG 40. Accordingly, motor generator MG2 assists the engine for driving the vehicle, or for driving the vehicle by its own driving force alone. In a vehicle braking mode, motor generator MG2 is driven by front wheels 50L and 50R to operate as a power generator. At this stage, the electric power generated by motor generator MG2 charges power storage device 10 via PCU 20.

PCU 20 responds to a control instruction from ECU 15 to boost the DC voltage received from power storage device 10, and convert the boosted DC voltage into AC voltage to drive motor generators MG1 and MG2 in power output device 30. In a regenerative operation mode of motor generators MG1 and MG2, PCU 20 responds to a control instruction from ECU 15 to convert the AC voltage generated by motor generators MG1 and MG2 into DC voltage for charging power storage device 10.

Charging inlet 90 is configured to allow connection with the connector of a charging cable (not shown) connected to an external power supply. At the time of external charging, electric power is received from an external power supply connected to charging inlet 90. The received electric power is supplied to charger 92. Charger 92 located between charging inlet 90 and power storage device 10 converts the electric power supplied from the external power supply connected to charging inlet 90 to the level of the voltage of power storage device 10 for output thereto.

Figure 2:
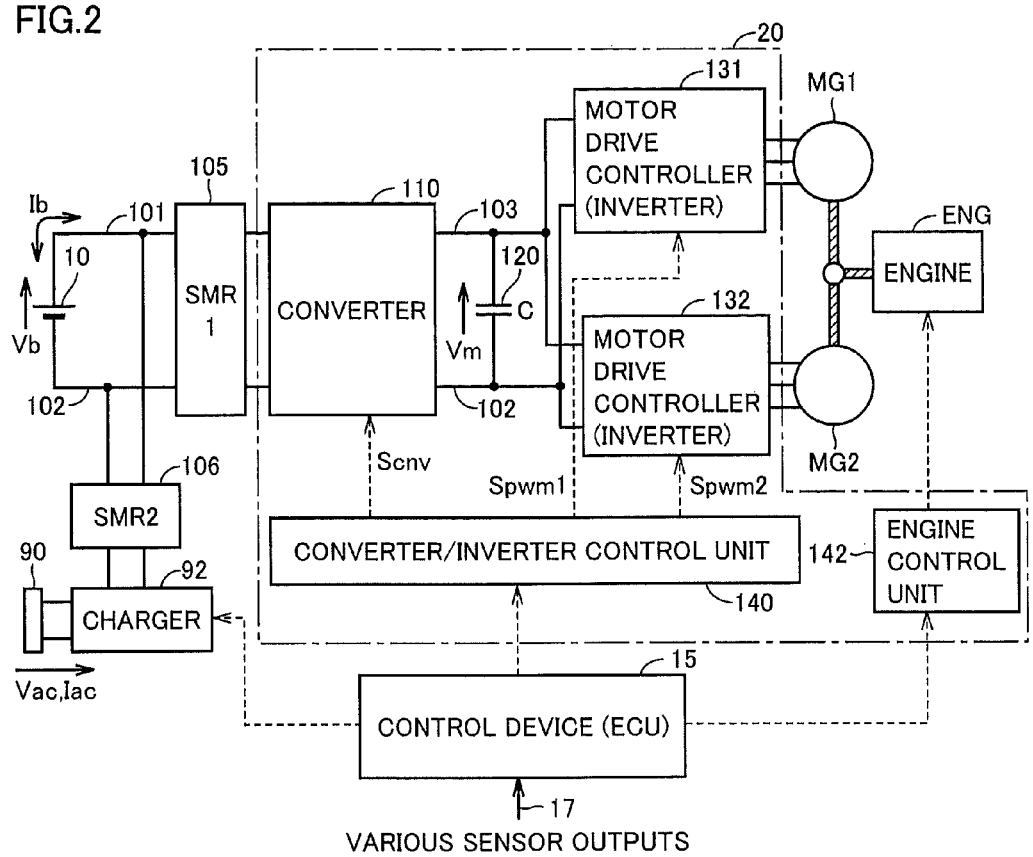
FIG. 2 is a block diagram representing a configuration of an electric system of the hybrid vehicle of FIG. 1.

FIG. 2 is a block diagram representing a configuration of the electric system of hybrid vehicle 100 shown in FIG. 1. Referring to FIG. 2, the electric system includes power storage device 10, SMRs (System Main Relay) 105 and 106, PCU 20, motor generators MG1 and MG2, ECU 15, charging inlet 90, and charger 92.

Motor generators MG1 and MG2 are connected to an engine ENG and driving wheels not shown (front wheels 50L and 50R of FIG. 1) via the power split device. Hybrid vehicle 100 can run using engine ENG and motor generator MG2. Motor generator MG1 starts engine ENG and generates electric power using the driving force of engine ENG.

SMR 105 is provided between power storage device 10 and PCU 20, and is set on in response to a command from ECU 15 in the event of a vehicle running. SMR 106 is provided between power storage device 10 and charger 92, and is set on according to a command from ECU 15 in the event of an external charging.

PCU 20 includes a converter 110, a capacitor 120, motor drive controllers 131 and 132, a converter/inverter control unit 140, and an engine control unit 142. In the present embodiment, motor generators MG1 and MG are AC motors, and motor drive controllers 131 and 132 are formed of inverters. Hereinafter, motor drive controller 131 (132) is also referred to as "inverter 131 (132)".

Converter 110 boosts a voltage Vm between a positive line 103 and a negative line 102 to a level greater than or equal to voltage Vb of power storage device 10 based on a control signal Scnv from converter/inverter control unit 140. Converter 110 is constituted of a current invertible type boost chopper circuit.

Inverters 131 and 132 are provided corresponding to motor generators MG1 and MG2, respectively. Inverters 131 and 132 are connected to converter 110 parallel to each other for driving motor generators MG1 and MG2 based on control signals Spwm1 and Spwm2, respectively, from converter/inverter control unit 140.

Converter/inverter control unit 140 generates control signals Scnv, Spwm1 and Spwm2 for driving converter 110, motor generator MG1 and motor generator MG2, respectively, based on control command values received from ECU 15 (the target value of voltage Vm, the torque target value of motor generators MG1, MG2, and the like). Converter/inverter control unit 140 outputs the generated control signals Scnv, Spwm1 and Spwm2 to converter 110, inverter 131, and inverter 132, respectively.

Engine control unit 142 calculates the rotational speed and output torque of engine ENG based on control command values received from ECU 15. Engine control unit 142 generates a control signal for driving engine ENG based on the calculated result, and outputs the generated control signal to engine ENG. Accordingly, engine ENG operates at load operation providing torque output according to the driver's request.

Furthermore, based on a control command received from ECU 15, engine control unit 142 generates a control signal for operating engine ENG such that torque is not substantially output, from the standpoint of component protection and the like (for example, oil lubrication), and outputs the generated control signal to engine ENG. Accordingly, engine ENG operates at no-load operation in which torque is substantially not output despite its operation (for example, idling operation).

According to various sensor outputs 17, ECU 15 carries out various control such as controlling the running mode of hybrid vehicle 100, charging and discharging control of power storage device 10, engine ENG start/stop determination, and the like. ECU 15 generates a control command value to drive PCU 20, and provides the generated control command value to converter/inverter control unit 140 and engine control unit 142 of PCU 20. ECU 15 generates and provides to charger 92 a signal for driving charger 92 in external charging.

Figure 3:
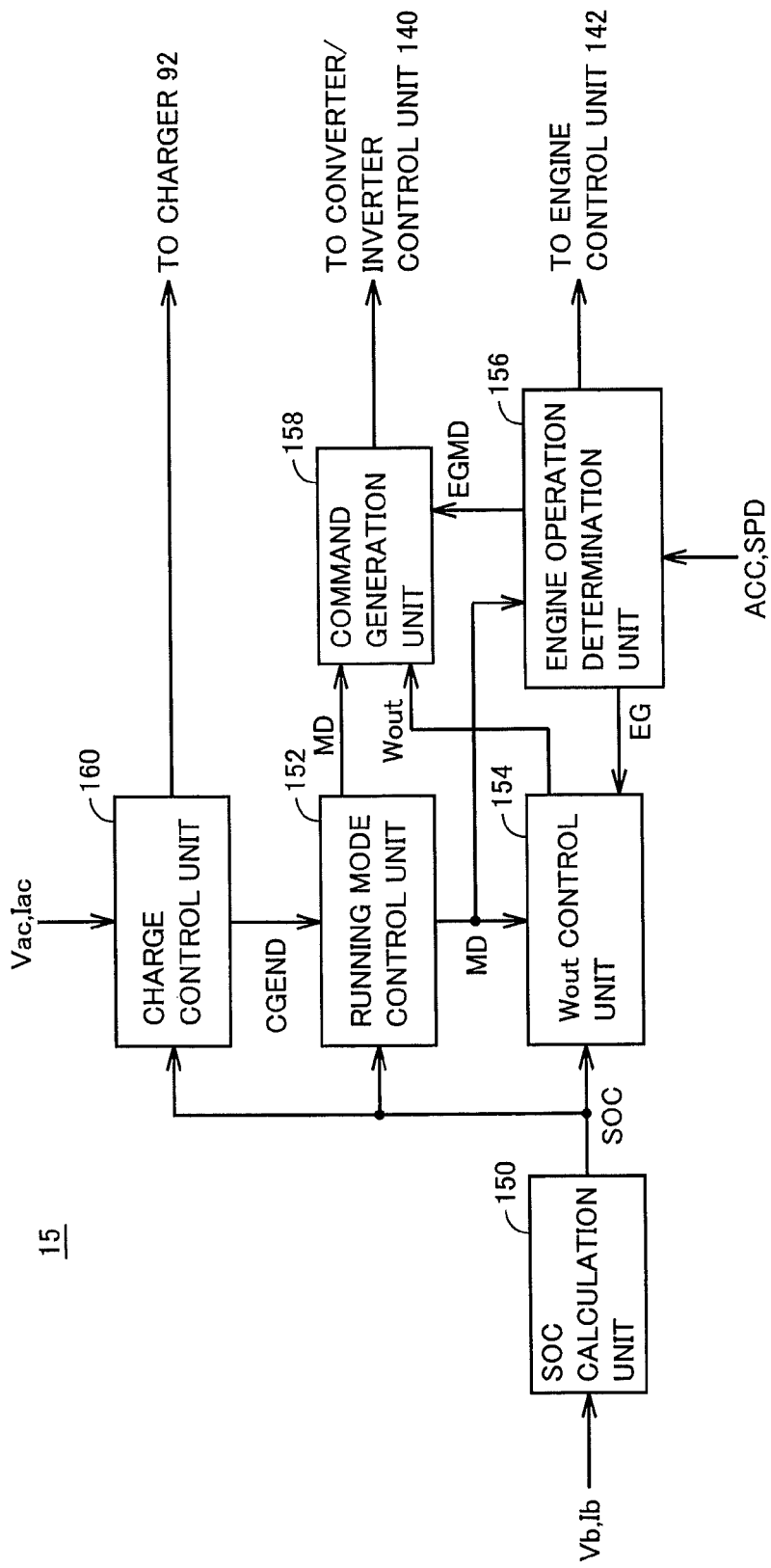
FIG. 3 is a functional block diagram of the ECU in FIG. 2.

FIG. 3 is a functional block diagram of ECU 15 in FIG. 2. Referring to FIG. 3, ECU 15 includes an SOC calculation unit 150, a running mode control unit 152, a Wout control unit 154, an engine operation determination unit 156, a command generation unit 158, and a charge control unit 160.

SOC calculation unit 150 calculates the SOC (state of charge) indicating the charging state of power storage device 10 based on voltage Vb and current Ib of power storage device 10 detected by a sensor not shown. The SOC represents in 0-100% the stored amount relative to a fully charged state of power storage device 10, and indicates the remaining stored amount in power storage device 10. For the method of calculating this SOC, various well-known methods can be employed.

Running mode control unit 152 controls the switching of the vehicle running mode based on the SOC calculated by SOC calculation unit 150. Specifically, running mode control unit 152 controls the switching to a CD mode in which engine ENG is stopped and running using motor generator MG2 alone is given priority, or a CS mode in which engine ENG is operated and the SOC of power storage device 10 is maintained at a predetermined target.

Even in the CD mode, the operation of engine ENG is allowed such as when the accelerator pedal is stepped on greatly by the driver, when an engine driving type air conditioner is operated, when in an engine warm-up state, or the like. The CD mode corresponds to a running mode in which the electric power stored in the power storage device 10 is basically used as the energy source for running the vehicle without maintaining the SOC of power storage device 10. During the CD mode, the ratio of discharging is eventually relatively greater than charging. In contrast, the CS mode is a running mode in which engine ENG is operated as necessary and power is generated by motor generator MG1 for maintaining the SOC of power storage device 10 at a predetermined target level, and is not limited to running with engine ENG always operated.

In other words, even if the running mode is at the CD mode, engine ENG will be operated if the accelerator pedal is stepped on greatly and large vehicle power is required. Furthermore, even if the running mode is at the CS mode, engine ENG will stop when the SOC exceeds the target value. Thus, irrespective of these running modes, running with engine ENG stopped and using motor generator MG2 alone is referred to as "EV running", whereas running with engine ENG operated and using motor generator MG2 and engine ENG is referred to as "HV running".

FIG. 4 represents the relationship between the change in the SOC of power storage device 10 and the running mode. Referring to FIG. 4, it is assumed that running is started after power storage device 10 attains a fully charged state (SOC=MAX) by external charging. Following external charging, the running mode is set at the CD mode. During running in a CD mode, the SOC generally decreases in accordance with increase of the running distance although the SOC may temporarily be increased by the regenerative electric power generated at the time of speed reduction or the like. When the SOC attains a threshold value Sth at time t1, the running mode is switched to the CS mode, and the SOC is regulated at the vicinity of threshold value Sth.

Referring to FIG. 3 again, running mode control unit 152 sets the running mode at the CD mode upon receiving a charging end signal CGEND indicating the termination of external charging from charge control unit 160. Then, running mode control unit 152 outputs a mode signal MD indicating whether the running mode is at the CD mode or CS mode to Wout control unit 154, engine operation determination unit 156, and command generation unit 158.

Wout control unit 154 receives the SOC of power storage device 10 from SOC calculation unit 150 and mode signal MD indicating the running mode from running mode control unit 152. Wout control unit 154 receives an engine operation flag EG indicating that engine ENG is operating from engine operation determination unit 156. Based on these signals, Wout control unit 154 calculates discharge allowable power Wout indicating the electric power (W) that can be discharged from power storage device 10.

FIG. 5 represents discharge allowable power Wout of power storage device 10. Referring to FIG. 5, discharge allowable power Wout represents the maximum level of the electric power (W) that can be output from power storage device 10. When the SOC of power storage device 10 decreases, discharge allowable power Wout is controlled to prevent overdischarging.

In the present embodiment, discharge allowable power Wout is modified based on the vehicle running mode and operation/stop of engine ENG, as will be described afterwards. Specifically, when the running mode is at the CD mode and engine ENG is operated, or when the running mode is at the CS mode, discharge allowable power Wout is set at the default value of W0. When the running mode is at the CD mode and engine ENG is stopped, discharge allowable power Wout is increased from W0 to a predetermined W1.

Charging allowable power Win is the maximum value of electric power (W) that can be input to power storage device 10. Charging allowable electric power Win is restricted when the SOC of power storage device 10 becomes high to prevent overcharging.

Referring to FIG. 3 again, Wout control unit 154 calculates discharge allowable power Wout (default value W0) based on the SOC of power storage device 10, the temperature, and the like using a map prepared in advance. Wout control unit 154 modifies discharge allowable power Wout based on the running mode indicated by mode signal MD received from running mode control unit 152 and engine ENG operation/stop indicated by engine operation flag EG from engine operation determination unit 156.

As shown in FIG. 6, when the running mode is at the CD mode and engine ENG is stopped, Wout control unit 154 increases discharge allowable power Wout from W0 to predetermined W1 (FIG. 5). In contrast, when the running mode is at the CD mode and engine ENG is operated, or when the running mode is at the CS mode, Wout control unit 154 does not increase discharge allowable power Wout.

The reason why discharge allowable power Wout is increased when the running mode is at the CD mode and engine ENG is stopped is to minimize the starting frequency of engine ENG to extend EV running. In other words, when the accelerator pedal is stepped on and the vehicle required power exceeds discharge allowable power Wout even if the running mode is at the CD mode, engine ENG is started and the vehicle is switched from EV running to HV running to satisfy the required power.

However, the driver cannot enjoy the sense of EV running sufficiently if engine ENG is frequently started in response to stepping on the accelerator pedal. The present embodiment is directed to improving the sense of EV running by increasing discharge allowable power Wout to suppress the frequency of starting engine ENG when the running mode is at the CD mode and engine ENG is stopped.

In the present embodiment, discharge allowable power Wout is not always increased. Discharge allowable power Wout is not increased when the running mode is at the CD mode and engine ENG is operated, or when the running mode is at the CS mode. This is to suppress increase of the heat load on electrical components (mainly converter 110), and to avoid the change in the vehicle acceleration property between applying or not applying the present embodiment when the engine is operated and when running in the CS mode.

Referring to FIG. 3 again, Wout control unit 154 outputs to command generation unit 158 discharge allowable power Wout subjected to the modification set forth above based on the running mode and engine ENG operation/stop.

Engine operation determination unit 156 receives a mode signal MD indicating the running mode from running mode control unit 152. Engine operation determination unit 156 carries out an operation determination of engine ENG based on the running mode.

Specifically, engine operation determination unit 156 calculates the vehicle required power based on an accelerator pedal position ACC, vehicle speed SPD, and the like received as various sensor outputs 17 (FIG. 1). When the running mode is at the CS mode, engine operation determination unit 156 calculates the power that can be output by motor generator MG2 based on discharge allowable power Wout that is not increased (default value W0 of FIG. 5), and determines whether engine ENG is to be set at load operation or not based on the comparison result between the calculated power and the vehicle required power.

When the running mode is at the CD mode, engine operation determination unit 156 calculates the power that can be output by motor generator MG2 based on the increased discharge allowable power Wout (W1 of FIG. 5), and determines whether engine ENG is to be set at load operation or not based on the comparison result between the calculated power and the vehicle required power.

Furthermore, from the standpoint of component protection and the like, when a predetermined condition is established (for example, the stopped state of engine ENG continues for a predetermined time), engine operation determination unit 156 determines that engine ENG is to be operated at no-load operation. When engine ENG is at no-load operation, engine operation determination unit 156 calculates the power that can be output by motor generator MG2 based on non-increased discharge allowable power Wout (W0) even if the running mode is at CD mode, and determines whether engine ENG is to be set at load operation or not based on the comparison result between the calculated power and the vehicle required power.

Figures 7, 8:
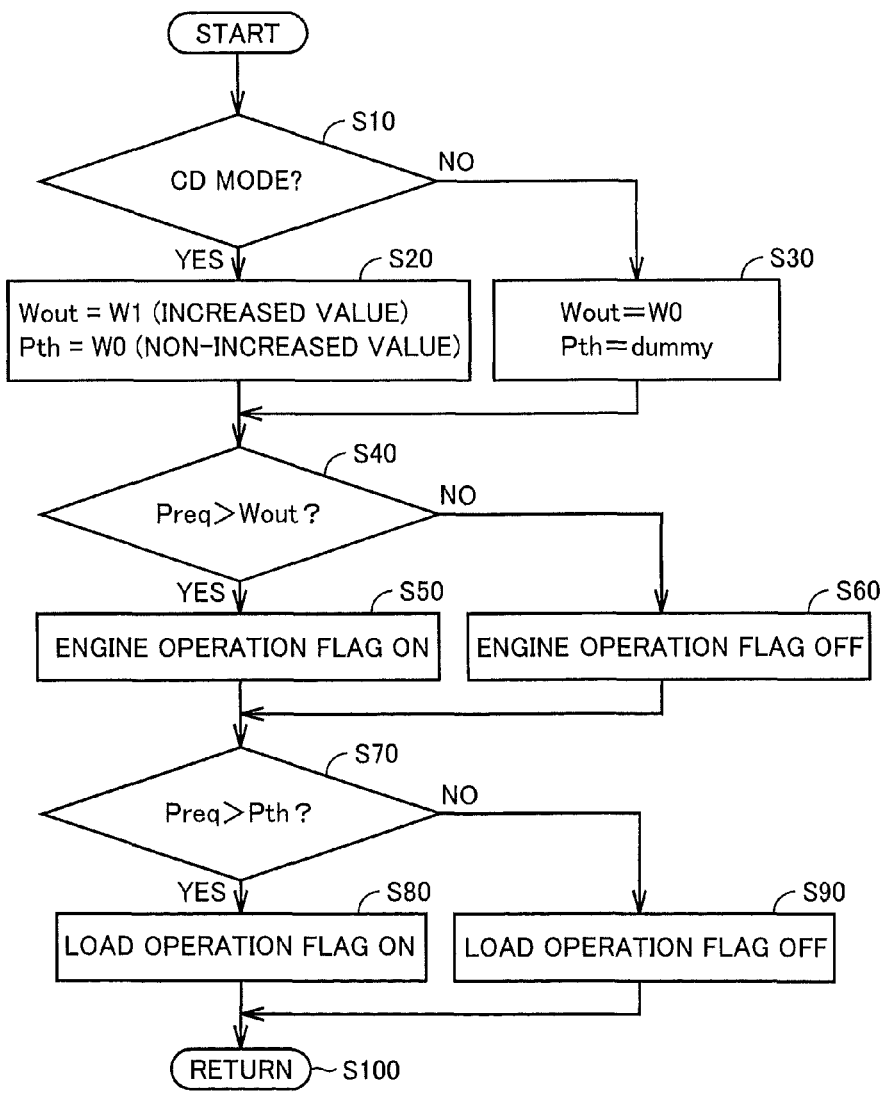
FIG. 7 is a diagram to describe a determination threshold value for determining whether the engine is to be set at load operation or not.
FIG. 8 is a first flowchart for realizing determination processing as to whether the engine is to be set at load operation or not.

As shown in FIG. 7, when the running mode is at the CD mode, a determination as to whether engine ENG is to be set at load operation or not is made, based on an increased discharge allowable power Wout (W1) as a general rule. However, in the case where engine ENG is operating at no-load operation, a determination as to whether engine ENG is to be set at load operation or not is made based on non-increased discharge allowable power Wout (W0) even if the running mode is at the CD mode. When the running mode is at the CS mode, a determination as to whether engine ENG is to be set at load operation or not is made based on non-increased discharge allowable power Wout (W0).

The reason why non-increased discharge allowable power Wout (W0) is used even if the running mode is at the CD mode, when engine ENG is in a no-load operation state, is set forth below. Since engine ENG operates even at no-load operation, discharge allowable power Wout of power storage device 10 is a non-increased value (W0), as shown in FIG. 6. If an increased discharge allowable power Wout (W1) is used for determining whether engine ENG is to be set at load operation or not due to the running mode being at the CD mode, the situation in which the discharged electric power from power storage device 10 is restricted to W0 and engine ENG cannot attain a load operation until the vehicle required power reaches W1 will arise. As a result, the actual power relative to the required power is insufficient and the driveability degraded until the vehicle required power reaches W1 after exceeding W0.

Thus, the present embodiment is directed to, when the running mode is at the CD mode, determining whether engine ENG is to be set at load operation or not based on increased discharge allowable power Wout (W1), and based on non-increased discharge allowable power Wout (W0), even if the running mode is at the CD mode, when engine ENG is operating at no-load operation.

Then, engine operation determination unit 156 sets the engine operation flag output to Wout control unit 154 and command generation unit 158 that will be described afterwards at ON and at OFF when engine ENG is operating (including the operation in no-load operation) and when engine ENG is stopped, respectively.

Referring to FIG. 3 again, command generation unit 158 generates a control command value for driving PCU 20 (for example, target value of voltage Vm, torque target value of motor generators MG1, MG2, and the like), based on the running mode, discharge allowable power Wout, and the engine operation flag indicating the operation/stop state of engine ENG. Command generation unit 158 outputs the generated control command value to converter/inverter control unit 140 (FIG. 2) of PCU 20.

When an external power supply is connected to charging inlet 90 (FIG. 2), charge control unit 160 generates and provides to charger 92 a control signal for driving charger 92, based on an input voltage Vac and input current Iac detected by sensors not shown. When the SOC of power storage device 10 received from SOC calculation unit 150 reaches a predetermined upper limit value, charge control unit 160 ends the charging control and outputs a charging end signal CGEND indicating the end of charging to running mode control unit 152. Accordingly, the running mode is set at the CD mode at running mode control unit 152, as described above.

Figure 9:
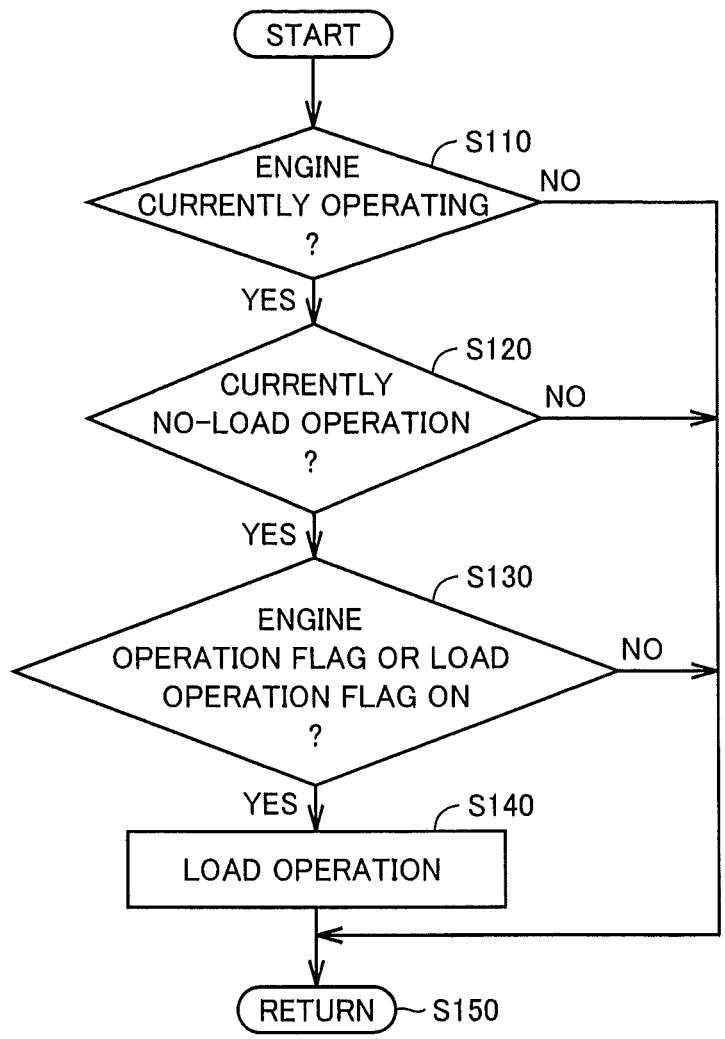
FIG. 9 is a second flowchart for realizing determination processing as to whether the engine is to be set at load operation or not.

FIGS. 8 and 9 are flowcharts for realizing the processing of determining whether engine ENG is to be set at load operation or not. Referring to FIG. 8, ECU 15 determines whether the running mode is at the CD mode or not (step S10). When a determination is made that the running mode is at the CD mode (YES at step S10), ECU 15 sets discharge allowable power Wout at W1 (increased value), and sets threshold value Pth used for determining whether engine ENG is to be set at load operation or not at W0 (step S20). However, when a determination is made that the running mode is not at the CD mode, i.e. in the CS mode, at step S10 (NO at step S10), ECU 15 sets discharge allowable power Wout at W0 (non-increased value), and sets threshold value Pth at a dummy value (large value) (step S30). Threshold value Pth is set at a dummy value (large value) in a CS mode since the determination as to whether engine ENG is to be set at load operation or not is required only in a CD mode and not required in a CS mode that is based on load operation.

Then, ECU 15 determines whether vehicle required power Preq is greater than discharge allowable power Wout (step S40). When a determination is made that vehicle required power Preq is greater than discharge allowable power Wout (YES at step S40), ECU 15 sets the engine operation flag indicating the operation/stop of engine ENG at ON (step S50). When a determination is made that vehicle required power Preq is less than or equal to discharge allowable power Wout (NO at step S40), ECU 15 sets the engine operation flag at OFF (step S60).

Then, ECU 15 determines whether vehicle required power Preq is greater than threshold value Pth for determining whether engine ENG is to be set at load operation or not (step S70). When a determination is made that vehicle required power Preq is greater than threshold value Pth (YES at step S70), ECU 15 sets the load operation flag indicating a load operation of engine ENG at ON (step S80). In contrast, when a determination is made that vehicle required power Preq is less than or equal to threshold value Pth (NO at step S70), ECU 15 sets the load operation flag at OFF (step S90).

Referring to FIG. 9, ECU 15 determines whether engine ENG is currently operating or not (step S110). When a determination is made that engine ENG is not currently operating, i.e. in a stopped state (NO at step S110), ECU 15 proceeds to step S150 without executing the subsequent series of processing.

When a determination is made that engine ENG is currently operating at step S110 (NO at step S110), ECU 15 further determines whether engine ENG is currently at no-load operation or not (step S120). When a determination is made than engine ENG is not currently at no-load operation, i.e. currently in a load operation (NO at step S120), control proceeds to step S150.

When a determination is made that engine ENG is currently in no-load operation at step S120 (YES at step S120), ECU 15 determines whether the aforementioned engine operation flag or load operation flag is ON or not (step S130). When a determination is made that the engine operation flag or load operation flag is ON (YES at step S130), ECU 15 operates engine ENG at load operation (step S140). When both the engine operation flag and load operation flag are OFF (NO at step S130), control proceeds to step S150.

The manner of the operation state of engine ENG changing when the running mode is at the CD mode will be described hereinafter with reference to timing charts.

Figure 10:
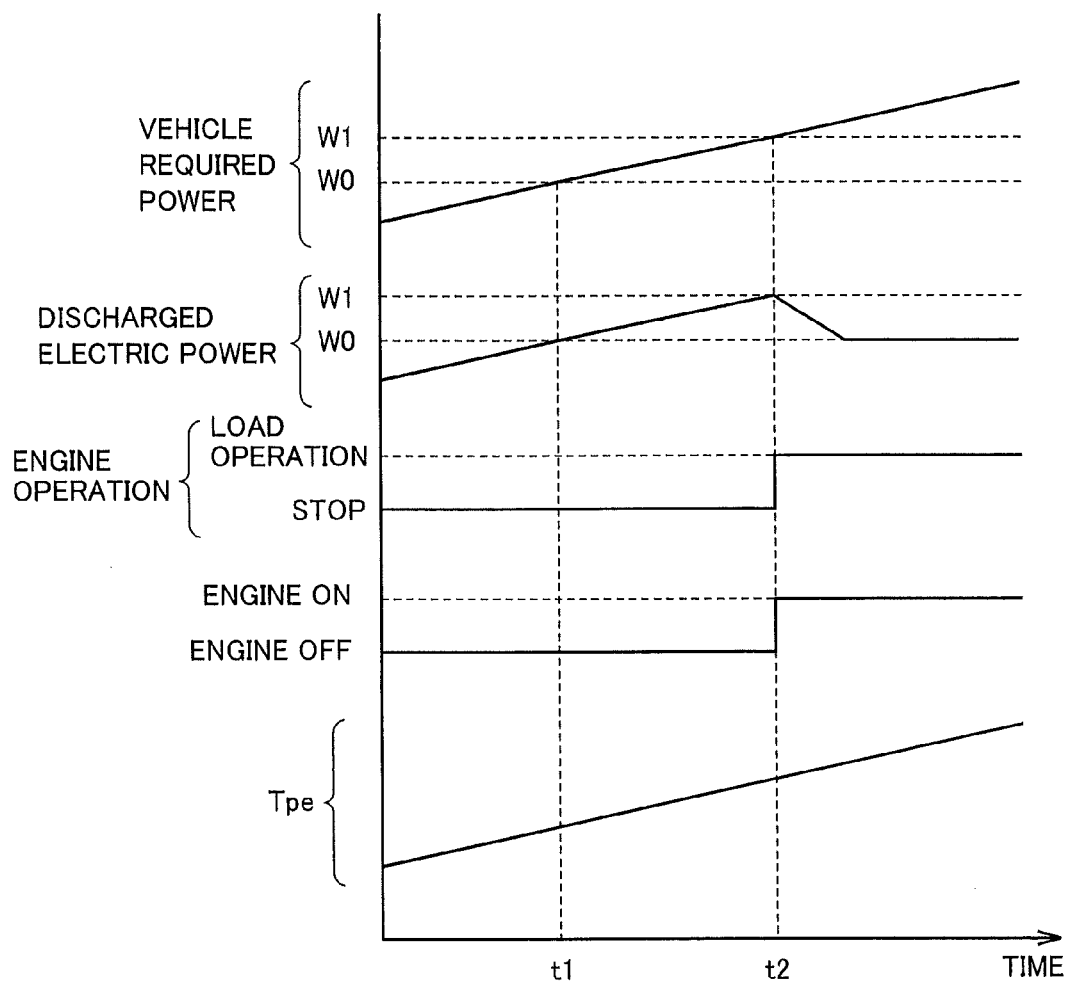
FIG. 10 is a timing chart when the engine is shifted from a stopped state to load operation.

FIG. 10 is a timing chart when engine ENG is shifted from a stopped state to load operation. Referring to FIG. 10, it is assumed that, before time t1, the vehicle required power is lower than W0 (non-increased value of discharge allowable power Wout), and engine ENG is stopped.

Since the running mode is at the CD mode and engine ENG is stopped, discharge allowable power Wout is increased to W1, and the determination threshold value for setting engine ENG at load operation or not is set at W1. Therefore, even if the vehicle required power reaches W0 at time t1, engine ENG will not start.

When vehicle required power reaches W1 at time t2, engine ENG attains load operation from a stopped state to be started (engine ON). Thus, when engine ENG is to be shifted to load operation from a stopped state, drive shaft torque Tpe increases according to the increase of the vehicle required power since engine ENG attains load operation despite the discharging electric power from power storage device 10 being restricted at time t2 and et seq.

Figure 11:
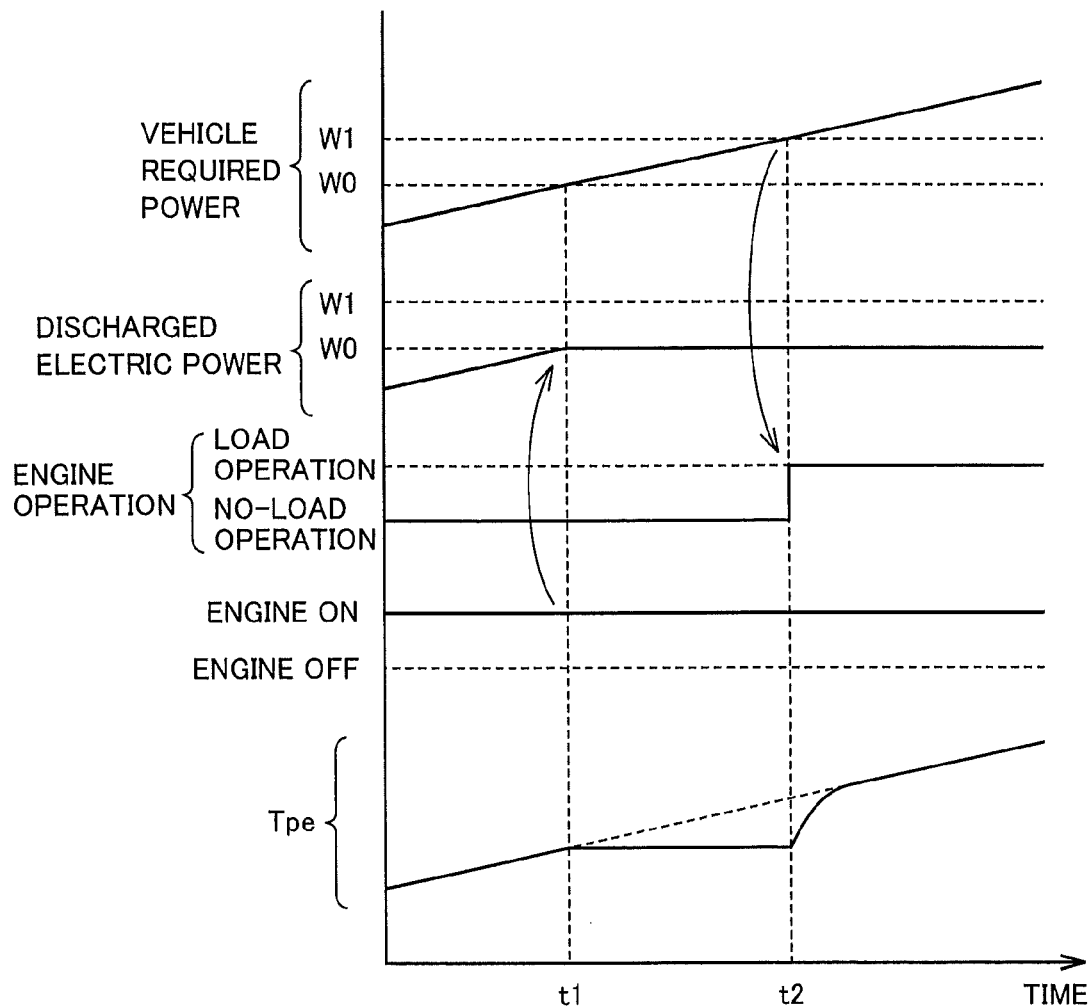
FIG. 11 is a timing chart based on conventional art when the engine is shifted from no-load operation to load operation.
Figure 12:
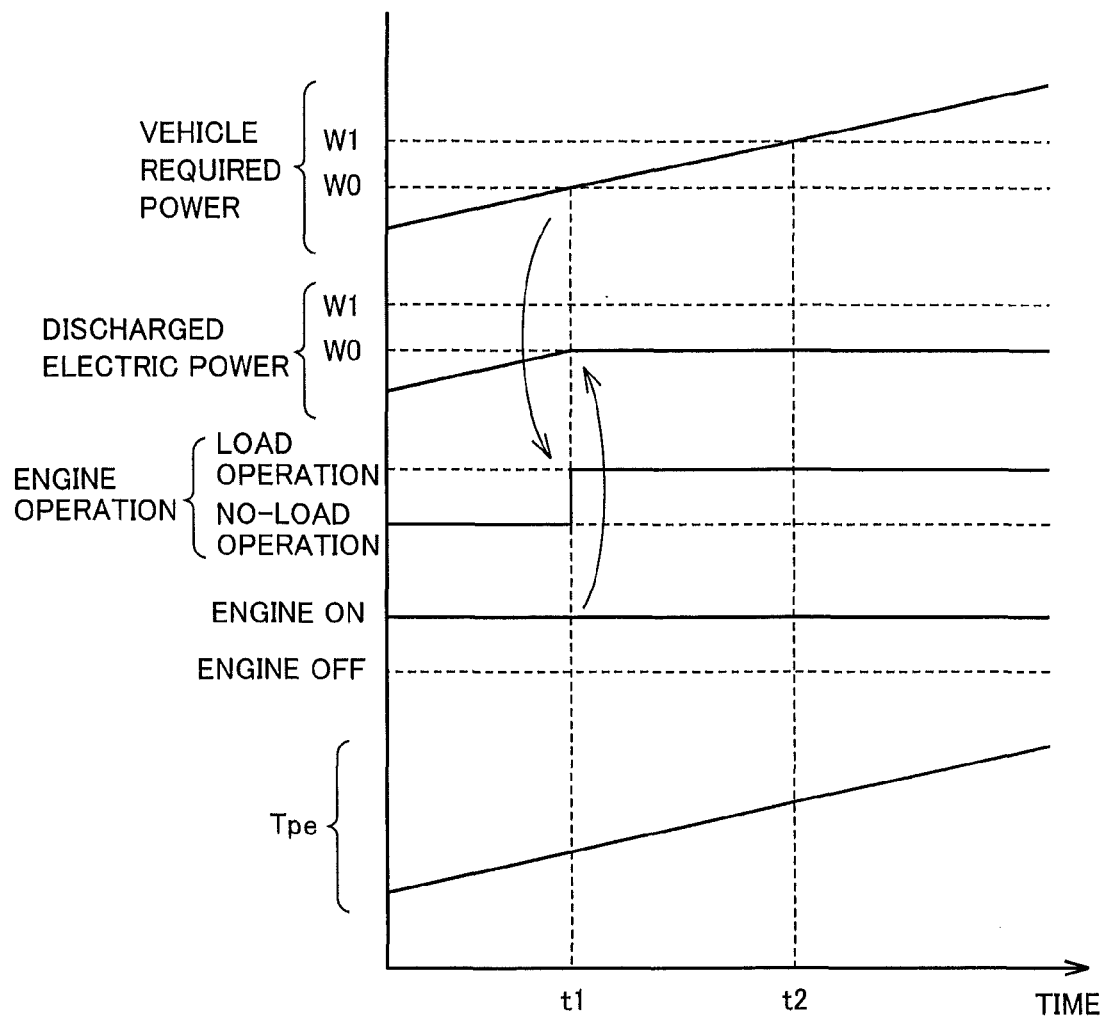
FIG. 12 is a timing chart when the engine is shifted from no-load operation to load operation.

FIGS. 11 and 12 are timing charts when engine ENG is shifted to load operation from no-load operation. FIG. 11 represents a timing chart based on conventional art as a comparison example. FIG. 12 is a timing chart corresponding to the present embodiment.

Referring to FIG. 11, it is assumed that, although the vehicle require power is smaller than W0 (non-increased value of discharge allowable power Wout), engine ENG is operating at no-load operation from the standpoint of component protection and the like prior to time t1. Since engine ENG is operating, discharge allowable power Wout is W0 that is not increased, and the discharging electric power from power storage device 10 is restricted to W0 at time t1 and et seq. Conventionally, the threshold value used for determining whether engine ENG is to be set at load operation or not is always at W1 (increased value of Wout) when the running mode is at the CD mode. Therefore, engine ENG does not attain load operation until the vehicle required power reaches W1 at time t2.

Accordingly, from time t1 to t2, the discharged electric power of power storage device 10 is restricted to W0, and the no-load operation of engine ENG is continued. In other words, during time t1 to t2, driving shaft torque Tpe will not be increased although the vehicle required power is increasing. As a result, the driveability is degraded.

Referring to FIG. 12, even if the running mode is at the CD mode in the present embodiment, the threshold value used for determining whether engine ENG is to be set at load operation or not is set at W0 (non-increased value) identical to discharge allowable power Wout when engine ENG is at no-load operation. Therefore, when the vehicle required power reaches W0 at time t1, engine ENG is shifted to load operation and drive shaft torque Tpe increases according to the increase of the vehicle required power subsequent to time t1, although the discharging electric power from power storage device 10 is restricted to W0.

When the running mode is at the CD mode and engine ENG is running in no-load operation, W0 is used also for the determination threshold value corresponding to the stopping of engine ENG in the case where engine ENG is shifted to load operation based on the non-increased value of W0. This is because, if the determination threshold value for engine stopping is immediately set at W1 after engine ENG has been shifted to load operation, the power will be reduced since the engine is immediately stopped, causing engine ENG to be started again, followed by the occurrence of hunting that is the repetition of engine ENG being started and stopped.

Thus, when the running mode is at the CD mode and engine ENG is stopped in the present embodiment, discharge allowable power Wout is increased from W0 to W1. The determination as to whether engine ENG is to be set at load operation or not is made, based on W0 when the running mode is at the CS mode, and based on W1 as a general rule when the running mode is at the CD mode. In the case where engine ENG is operating at no-load operation in the present embodiment, the determination as to whether engine ENG is to be set at load operation or not is made based on W0 even if the running mode is at the CD mode. Accordingly, the event of the actual power being insufficient relative to the required power can be prevented. Thus, according to the present embodiment, EV running can be extended and degradation of driveability that may occur in no-load operation can be prevented.

[Modification]

The determination processing as to whether engine ENG is to be set at load operation or not can be realized by the procedure of the processing shown in the flowcharts set forth below, instead of the flowcharts of FIGS. 8 and 9.

Figure 13:
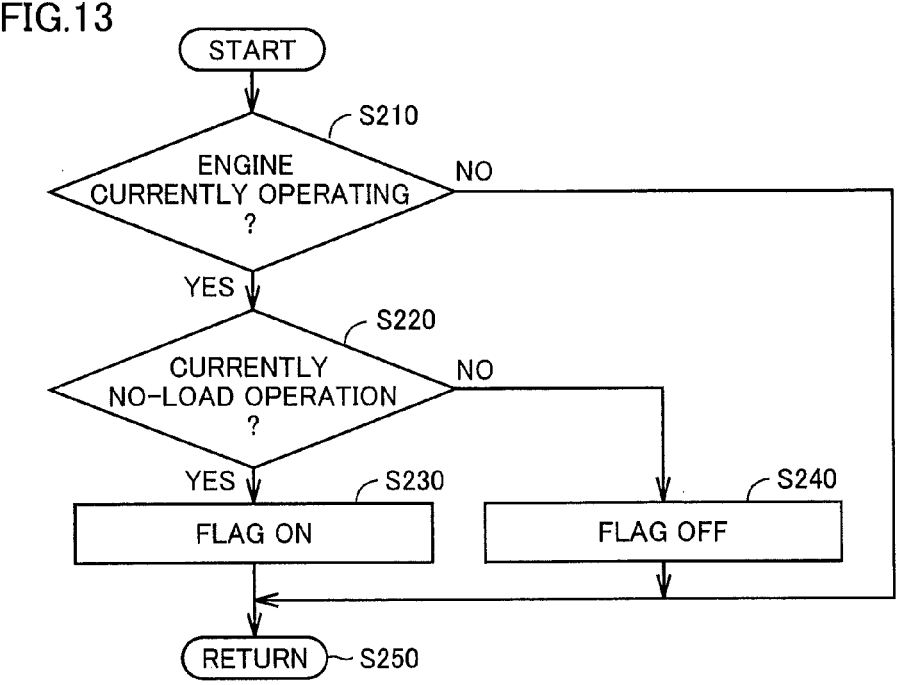
FIG. 13 is another first flowchart for realizing determination processing as to whether the engine is to be set at load operation or not.
Figure 14:
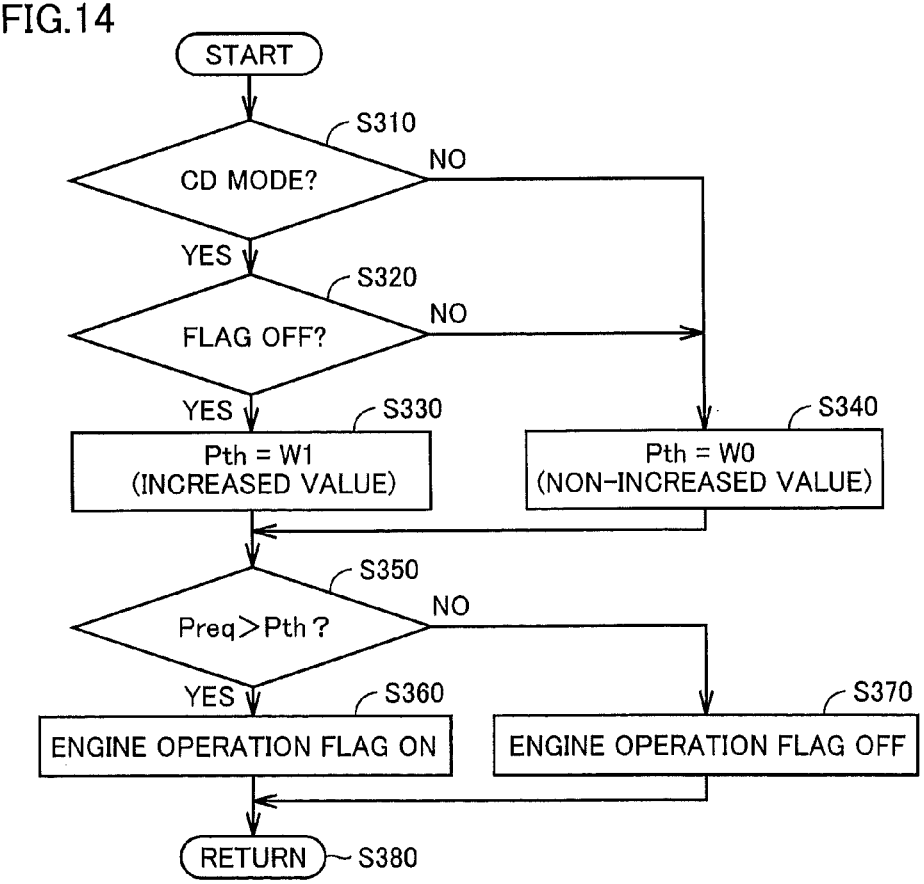
FIG. 14 is another second flowchart for realizing determination processing as to whether the engine is to be set at load operation or not.

FIGS. 13 and 14 are other flowcharts for realizing the determination processing as to whether engine ENG is to be set at load operation or not. Referring to FIG. 13, ECU 15 determines whether engine ENG is currently operating or not (step S210). When a determination is made that engine ENG is not operating, i.e. when engine ENG is currently stopped (NO at step S210), ECU 15 proceeds to step S250 without executing the subsequent series of processing.

When a determination is made that engine ENG is currently operating at step S210 (YES at step S210), ECU 15 further determines whether engine ENG is currently at no-load operation or not (step S220). When a determination is made than engine ENG is at no-load operation (YES at step S220), ECU 15 sets a predetermined flag at ON (step S230). When a determination is made that engine ENG is not at no-load operation, i.e. currently in load operation (NO at step S220), ECU 15 sets the aforementioned flag at OFF (step S240).

Referring to FIG. 14, ECU 15 determines whether the running mode is at the CD mode or not (step S310). When a determination is made that the running mode is at the CD mode (YES at step S310), ECU 15 further determines whether the aforementioned flag is OFF or not (step S320). When a determination is made that the flag is OFF (YES at step S320), a determination is made that engine ENG is currently at load operation. ECU 15 sets threshold value Pth used to determine whether engine ENG is to be set at load operation or not at W1 (increased value of discharge allowable power Wout) (step S330).

When a determination is made that the running mode is not at the CD mode, i.e. the running mode is at the CS mode, at step S310 (NO at step S310), or a determination is made that the aforementioned flag is not OFF, i.e. the flag is ON, at step S320 (NO at step S320), ECU 15 sets threshold value Pth used for determining whether engine ENG is to be set at load operation or not at W0 (non-increased value of discharge allowable power Wout) (step S340).

Then, ECU 15 determines whether vehicle required power Preq is greater than threshold value Pth used for determining whether engine ENG is to be set at load operation or not (step S350). When a determination is made that vehicle required power Preq is greater than threshold value Pth (YES at step S350), ECU 15 sets the engine operation flag at ON (step S360). In contrast, when a determination is made that vehicle required power Preq is less than or equal to threshold value Pth (NO at step S350), ECU 15 sets the engine operation flag at OFF (step S370).

The above embodiment has been described based on a configuration in which only one power storage device 10 and one converter 110 are provided. However, the present invention is also applicable to an electric system in which a plurality of power storage devices and converters are provided (for example, an electric system including a plurality of power storage devices, and a plurality of converters connected parallel thereto).

Furthermore, although the embodiment has been described in which external charging is carried out with an external power supply connected to charging inlet 90, external charging may be carried out by a non-contact feeding method such as by resonance, electromagnetic induction, and the like.

In the foregoing, engine ENG corresponds to an example of "internal combustion engine" of the present embodiment. Motor generator MG2 corresponds to an example of "electric motor" of the present invention. Wout control unit 154 corresponds to an example of "discharge allowable power control unit" of the present invention. Engine operation determination unit 156 corresponds to an example of "determination unit" of the present invention.

It should be understood that the embodiments disclosed herein are illustrative and nonrestrictive in every respect. The scope of the present invention is defined by the terms of the claims, rather than the description of embodiment set forth above, and is intended to include any modification within the scope and meaning equivalent to the terms of the claims.

REFERENCE SIGNS LIST 10 power storage device; 15 ECU; 17 various sensor outputs; 20 PCU; 30 power output device; 35 accelerator pedal; 40 DG; 50L, 50R front wheel; 60L, 60R rear wheel; 70L, 70R front seat; 80 rear seat; 90 charging inlet; 92 charger; 100 hybrid vehicle; 105, 106 SMR; 110 converter; 120 capacitor; 131, 132 inverter; 140 converter/inverter control unit; 142 engine control unit; 150 SOC calculation unit; 152 running mode control unit; 154 Wout control unit; 156 engine operation determination unit; 158 command generation unit; 160 charge control unit; MG1, MG2 motor generator; ENG engine.

The invention claimed is:

1. A control device for a hybrid vehicle,
said hybrid vehicle including
an internal combustion engine generating vehicle driving force,
a power storage device capable of being charged and discharged, and
an electric motor receiving electric power from said power storage device for generating vehicle driving force,
said internal combustion engine controlled so as to operate at load operation in which torque is output or at no-load operation in which torque is not substantially output, said control device comprising:
a running mode control device programmed to control switching of a running mode including;
a charge depleting mode in which a state of charge indicating a charging state of said power storage device is depleted, and
a charge sustaining mode in which the state of charge indicating the charging state of said power storage device is maintained at a predetermined target,
each of said charge depleting mode and said charge sustaining mode includes a state in which said internal combustion engine is operating and a state in which said internal combustion engine is stopped,
a discharge allowable power control device programmed to set a discharge allowable power indicating electric power that can be discharged by said power storage device:
at a predetermined first value:
when said running mode is at said charge depleting mode and said internal combustion engine is operating, or
when said running mode is at said charge sustaining mode, and
increasing said discharge allowable power to a second value greater than said first value when said running mode is at said charge depleting mode and said internal combustion engine is stopped, and
a determination device programmed to determine whether said internal combustion engine is to be set at said load or said no-load operation,
based on said first value when said running mode is said charge sustaining mode and
based on said second value when said running mode is at said charge depleting mode and when said internal combustion engine is not operating at said no-load operation, and
when said internal combustion engine is operating at said no-load operation, said determination device is programmed to determine whether to set said internal combustion engine at said load operation or not based on said first value, even if said running mode is at said charge depleting mode.

2. The control device for a hybrid vehicle according to claim 1, wherein,
when said running mode is at said charge depleting mode and said internal combustion engine is operating at said no-load operation,
said determination device is programmed to determine whether to stop said internal combustion engine based on said first value.

3. A hybrid vehicle comprising the control device according to claim 1, said hybrid vehicle further including
a charging device configured to receive supply of electric power from a power supply external to the vehicle to charge said power storage device,
wherein said running mode control device is programmed to set said running mode at said charge depleting mode after said power storage device is charged by said charging device.

4. A control device for a hybrid vehicle,
said hybrid vehicle including
an internal combustion engine generating vehicle driving force,
a power storage device capable of being charged and discharged, and
an electric motor receiving electric power from said power storage device for generating vehicle driving force,
said internal combustion engine controlled so as to operate at load operation in which torque is output or at no-load operation in which torque is not substantially output,
said control device comprising:
a running mode control device programmed to control switching of a running mode including;
a charge depleting mode in which a state of charge indicating a charging state of said power storage device is depleted, and
a charge sustaining mode in which the state of charge indicating the charging state of said power storage device is maintained at a predetermined target,
each of said charge depleting mode and said charge sustaining mode includes a state in which said internal combustion engine is operating and a state in which said internal combustion engine is stopped,
a discharge allowable power control device programmed to set a discharge allowable power indicating electric power that can be discharged by said power storage device;
at a predetermined first value
when said running mode is at said charge depleting mode and said internal combustion engine is operating, or
when said running mode is at said charge sustaining mode, and
increasing said discharge allowable power to a second value greater than said first value when said running mode is at said charge depleting mode and said internal combustion engine is stopped, and
a determination device programmed to determine, when said running mode is at said charge depleting mode, whether said internal combustion engine is to be set at said load operation or not from a state not at said load operation,
based on said first value when said internal combustion engine is operating at said no-load operation and
based on said second value when said internal combustion engine is not at said no-load operation.

5. The control device for a hybrid vehicle according to claim 4, wherein, when said running mode is at said charge sustaining mode, said determination device is programmed to determine whether said internal combustion engine is to be set at said load operation from a state not at said load operation based on said first value.

6. The control device for a hybrid vehicle according to claim 4, wherein, when said running mode is at said charge depleting mode and said internal combustion engine is operating at said no-load operation,
said determination device is programmed to determine whether to stop said internal combustion engine based on said first value.

7. A hybrid vehicle comprising the control device according to claim 4, said hybrid vehicle further including a charging device configured to receive supply of electric power from a power supply external to the vehicle to charge said power storage device,
wherein said running mode control device is programmed to set said running mode at said charge depleting mode after said power storage device is charged by said charging device.

* * * * *